Figure 1:
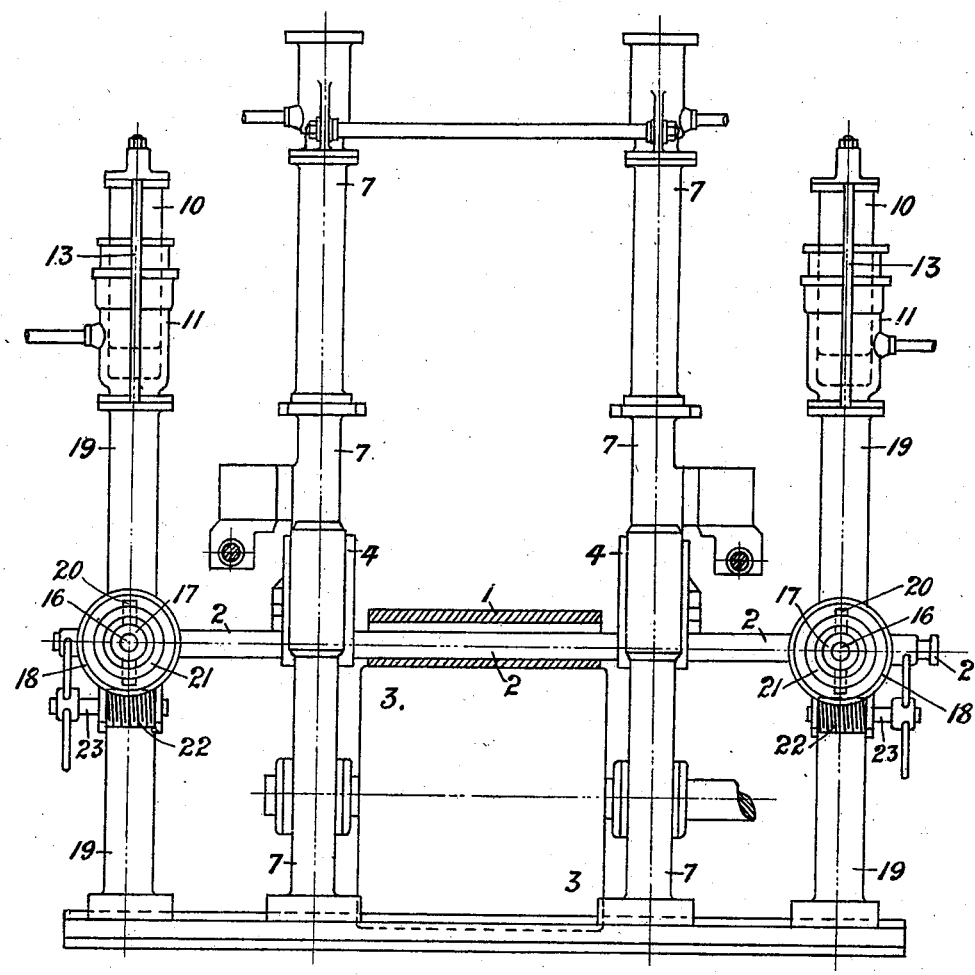

No. 861,880. PATENTED JULY 30, 1907.
B. F. McTEAR.
APPARATUS FOR THE MANUFACTURE OF METAL TUBES.
APPLICATION FILED APR. 29, 1904.

2 SHEETS—SHEET 1.

WITNESSES
INVENTOR
Balfour Fraser McTear
By
ATTORNEYS

No. 861,880. PATENTED JULY 30, 1907.
B. F. McTEAR.
APPARATUS FOR THE MANUFACTURE OF METAL TUBES.
APPLICATION FILED APR. 29, 1904.

2 SHEETS—SHEET 2.

UNITED STATES PATENT OFFICE.

BALFOUR FRASER McTEAR, OF RAINHILL, ENGLAND.

APPARATUS FOR THE MANUFACTURE OF METAL TUBES.

No. 861,880.　　　　Specification of Letters Patent.　　　Patented July 30, 1907.

Application filed April 29, 1904. Serial No. 205,543.

*To all whom it may concern:*

Be it known that I, BALFOUR FRASER McTEAR, a subject of the King of England, and a resident of Heyes Mount, Rainhill, in the county of Lancaster, England, have invented certain new and useful Improvements in Apparatus for the Manufacture of Metal Tubes, of which the following is a specification.

This invention has reference to the manufacture of tubes and hollow cylinders or cylindrical bodies of steel or other hard metals or alloys, and more especially tubes, cylinders, or other articles, which are made from seamless or weldless hollow blanks or billets.

The invention has more particularly for its objects and effects to provide improvements, as hereinafter described in connection with such manufacture, or in connection with the machinery employed, wherein hollow blanks or billets are rolled between an internal roller and an external roller, and the thickness of the walls of the billets or blank is thereby reduced, and, correspondingly, its diameter increased, while the walls are rendered of uniform thickness circularly, and also longitudinally.

In the machinery employed, generally, the external roller is not adjustable or movable, and the internal roller—which in most cases will be the smaller—is that which is adjusted or pressed towards the stationary external roller, and is pressed on to, and squeezes the metal of the blank, or billet, or immature tube, being rolled.

In the case where this internal roller is small, and is liable to bend materially by the forces and pressure which it is subjected to, due to the manner of its rotation or movement, and adjustment up to or towards the external roller, and other primary or secondary influences, there is sometimes a want of uniformity and steadiness of action and effect; and the improvements according to this invention by which this is obviated, consists in pressing or holding the internal roller at two points at each side, in a direction at right angles or transversely, to the plane in which the axes of the two rollers lie. According to one mode of effecting this, the internal roller, which extends beyond its main supporting and adjusting bearings, is held at or near these main bearings as regards movement in a transverse direction from the direction referred to, and is also pressed or held at points outside same, in this direction by bearings or the like adapted to act in such direction.

In a modified arrangement, the inner lateral bearings may be adapted to be moved and adjusted laterally; while the outer bearings may be maintained or fixed as regards movement in the lateral direction.

The invention is illustrated in the annexed drawings, in which

Figure 2:
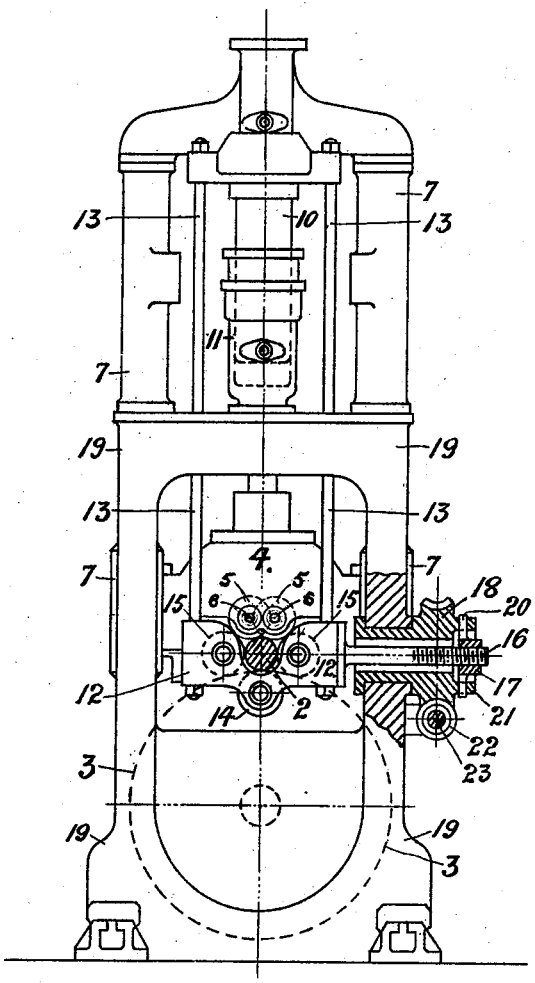

Figure 1 is a side elevation, and Fig. 2 is an end elevation showing the machine.

In the drawings, 1 is the hollow billet, 2 is the internal small roller; and 3 the large external supporting and driving roller, which is run at a high velocity, say from 1000 to 2000 peripheral feet per minute.

The internal roller 2 is pressed down in the rolling action by bearings 4 which carry roller bearing wheels 5 mounted on axles 6 working in the main frames 7, and the middle part of the mandrel roller 2 is kept straight, or prevented from bending from the strain and pressure on it, by a normal upward pull on the ends of it, outside the bearings 4, such pressure being exerted through the hydraulic rams 10, working in the hydraulic cylinders 11, and the bearings 12 connected with the rams by the rods 13, and carrying bearing rollers 14 directly under the outer end of the roller 2. These parts, however, form no part of the present invention.

It has been found that sometimes the roller 2 will bend in a horizontal direction, *i e*, in a direction at right angles to the plane in which the axes of the rollers 2 and 3 lie. This causes the hollow body to stretch in length sometimes and to sometimes shorten. To prevent this I mount in the bearing 12 rollers 15 on each side of the roller 2 and make the bearing 12 adjustable laterally, that is, crosswise, and capable of being pressed and held in any position in this direction.

The adjusting means shown in the annexed drawings consists in providing the bearing carriage 12 with a screwed shaft 16, and fitting a nut 17 on the screwed end of the shaft; such nut being carried by a worm wheel 18, supported and adapted to work in the frames 19 which carry the hydraulic cylinders 11.

The nut 17 is driven from the worm wheel 18 by arms 20, which pass through and work in projecting eyes 21 on the outside of the worm wheel. The center of the worm wheel 18 is made so large that the screwed shaft 16 does not touch it; and the mode of connection of nut and worm wheel, thus allows the movement of the carrier bearings 12 vertically, as well as horizontally.

Each worm wheel 18 is revolved by a worm 22, mounted on a shaft 23, carried by each of the frames 19.

If instead of adjusting the bearings 12 laterally, these are kept stationary, that is, could not move laterally; and if the moving down bearings 4 were held or adjusted, similarly as the main bearings 12 are held or adjusted, then the same effect would be obtained.

Having now particularly described my invention, what I claim as new and desire to secure by Letters Patent is:—

In a machine for rolling steel and other hard metal hollow bodies, an external roller for supporting the hollow body, an internal roller, movable main bearings for supporting the internal roller outside the ends of the hollow body to be rolled, and second bearings outside the said main bearings adapted to hold the ends of the internal roller projecting outside said main bearings, and means for adjusting and holding one of said sets of bearings in a plane at right angles to the plane in which the axes of the internal and external rollers lie; substantially as set forth.

In witness whereof I have hereunto set my hand in presence of two witnesses.

BALFOUR FRASER McTEAR.

Witnesses:
S. GOODALL,
F. H. JENNINGS.